(12) United States Patent
Hansen et al.

(10) Patent No.: US 10,677,068 B2
(45) Date of Patent: Jun. 9, 2020

(54) FAN BLADE WITH FILLED POCKET

(71) Applicant: United Technologies Corporation, Farmington, CT (US)

(72) Inventors: James O. Hansen, Glastonbury, CT (US); William R. Graves, Amston, CT (US); Michael A. Weisse, Tolland, CT (US); Christopher J. Hertel, Wethersfield, CT (US); Daniel A. Bales, Avon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 250 days.

(21) Appl. No.: 15/874,477

(22) Filed: Jan. 18, 2018

(65) Prior Publication Data

US 2019/0218914 A1    Jul. 18, 2019

(51) Int. Cl.
| | |
|---|---|
| *F01D 5/14* | (2006.01) |
| *F01D 5/28* | (2006.01) |
| *F02K 3/06* | (2006.01) |
| *B23P 15/04* | (2006.01) |
| *F01D 5/16* | (2006.01) |

(52) U.S. Cl.
CPC .............. *F01D 5/147* (2013.01); *B23P 15/04* (2013.01); *F01D 5/16* (2013.01); *F01D 5/282* (2013.01); *F01D 5/288* (2013.01); *F02K 3/06* (2013.01); *F05D 2220/32* (2013.01); *F05D 2220/36* (2013.01); *F05D 2230/25* (2013.01); *F05D 2230/30* (2013.01); *F05D 2230/40* (2013.01); *F05D 2250/241* (2013.01); *F05D 2300/2102* (2013.01); *F05D 2300/431* (2013.01); *F05D 2300/437* (2013.01); *F05D 2300/501* (2013.01); *F05D 2300/615* (2013.01)

(58) Field of Classification Search
CPC . F01D 5/147; F01D 5/16; F01D 5/288; F01D 5/282; B23P 15/04; F02K 3/06; F05D 2300/2102; F05D 2230/25; F05D 2250/241; F05D 2300/501; F05D 2220/36; F05D 2230/40; F05D 2300/431; F05D 2220/32; F05D 2300/615; F05D 2230/30; F05D 2300/437
USPC ......................................................... 415/200
See application file for complete search history.

(56) References Cited

U.S. PATENT DOCUMENTS

| | | | |
|---|---|---|---|
| 4,895,491 A * | 1/1990 | Cross .................... | F04D 29/388 |
| | | | 244/123.9 |
| 5,210,946 A * | 5/1993 | Monroe ................ | F04D 29/289 |
| | | | 29/525.07 |
| 5,295,789 A | 3/1994 | Daguet | |

(Continued)

FOREIGN PATENT DOCUMENTS

| | | | | |
|---|---|---|---|---|
| DE | 19814804 A1 * | 10/1999 | ................ | B60S 1/38 |
| EP | 0576117 A1 * | 12/1993 | ........... | F04D 29/388 |
| EP | 3184180 A1 | 6/2017 | | |

OTHER PUBLICATIONS

European Search Report for European Application No. 19152097.2 dated May 23, 2019, 8 pages.

*Primary Examiner* — J. Todd Newton
(74) *Attorney, Agent, or Firm* — Cantor Colburn LLP

(57) ABSTRACT

A fan of a gas turbine engine includes a plurality of fan blades secured to a rotor, each of the plurality of fan blades having an airfoil secured to the rotor at one end, wherein the airfoil comprises pockets filled with an elastomeric composite.

18 Claims, 4 Drawing Sheets

(56) References Cited

U.S. PATENT DOCUMENTS

| | | | | |
|---|---|---|---|---|
| 5,451,142 A | * | 9/1995 | Cetel | C23C 4/00 415/200 |
| 5,655,883 A | * | 8/1997 | Schilling | F01D 5/147 416/229 A |
| 5,786,285 A | * | 7/1998 | Walla | B29C 70/40 442/397 |
| 5,791,879 A | * | 8/1998 | Fitzgerald | F01D 5/147 416/229 A |
| 5,839,882 A | * | 11/1998 | Finn | F01D 5/147 416/229 A |
| 5,913,661 A | * | 6/1999 | Panovsky | F01D 5/147 415/119 |
| 5,931,641 A | * | 8/1999 | Finn | F01D 5/147 416/229 A |
| 5,947,688 A | | 9/1999 | Schilling et al. | |
| 6,039,542 A | * | 3/2000 | Schilling | F01D 5/16 416/224 |
| 6,282,786 B1 | | 9/2001 | Evans et al. | |
| 6,287,080 B1 | * | 9/2001 | Evans | B29C 39/10 415/200 |
| 6,287,642 B1 | * | 9/2001 | Leutsch | C23C 14/027 204/192.12 |
| 6,364,616 B1 | * | 4/2002 | Stevenson | B64C 11/00 416/224 |
| 6,454,536 B1 | * | 9/2002 | Evans | B29C 39/10 416/224 |
| 7,429,165 B2 | * | 9/2008 | Burdgick | F01D 5/282 416/229 A |
| 7,458,780 B2 | | 12/2008 | Weisse et al. | |
| 7,993,105 B2 | | 8/2011 | Weisse et al. | |
| 8,500,410 B2 | * | 8/2013 | De Moura | F01D 5/16 416/229 A |
| 8,858,182 B2 | | 10/2014 | Schwarz et al. | |
| 9,581,033 B2 | * | 2/2017 | Vontell | |
| 9,957,824 B2 | * | 5/2018 | Klinetob | F01D 5/26 |
| 2002/0090302 A1 | * | 7/2002 | Norris | F01D 5/147 416/224 |
| 2007/0065291 A1 | * | 3/2007 | Karafillis | F01D 5/16 416/224 |
| 2010/0008788 A1 | * | 1/2010 | Barbee | F01D 5/288 416/224 |
| 2010/0304107 A1 | * | 12/2010 | Nardi | C23C 28/341 428/217 |
| 2011/0211965 A1 | * | 9/2011 | Deal | F01D 5/147 416/223 R |
| 2013/0052437 A1 | * | 2/2013 | Barth | B05D 7/54 428/213 |
| 2014/0170435 A1 | * | 6/2014 | Hui | F01D 5/147 428/613 |
| 2014/0241897 A1 | | 8/2014 | Bales et al. | |
| 2014/0286785 A1 | * | 9/2014 | Ganesh | B23P 15/02 416/233 |
| 2014/0294594 A1 | | 10/2014 | Spoonire et al. | |
| 2016/0258303 A1 | * | 9/2016 | Rosenau | F01D 5/34 |
| 2019/0218914 A1 | * | 7/2019 | Hansen | F01D 5/16 |

\* cited by examiner

FAN BLADE WITH FILLED POCKET

BACKGROUND

Exemplary embodiments pertain to fan blades for turbine engines. More particularly, hollow fan blades.

A gas turbine engine typically includes a fan section, a compressor section, a combustor section and a turbine section. There is an ongoing need to reduce the weight of engine components and the cost of production while still providing suitable performance.

Accordingly, it is desirable to provide a fan blade that is strong, durable and lightweight.

BRIEF DESCRIPTION

In one embodiment, a fan of a gas turbine engine, includes: a plurality of fan blades secured to a rotor, each of the plurality of fan blades having an airfoil secured to the rotor at one end, wherein the airfoil comprises pockets filled with an elastomeric composite.

In addition to one or more of the features described above, or as an alternative to any of the foregoing embodiments, the airfoil further comprises an erosion coating disposed on the elastomeric composite.

In addition to one or more of the features described above, or as an alternative to any of the foregoing embodiments, the elastomeric composite comprises a silicone rubber.

In addition to one or more of the features described above, or as an alternative to any of the foregoing embodiments, the elastomeric composite comprises an elastomer and glass microspheres. The microspheres may be present in an amount of 10% to 30% by weight, based on the total weight of the elastomeric composite.

In addition to one or more of the features described above, or as an alternative to any of the foregoing embodiments, the pockets are located on the convex side of the airfoil.

In addition to one or more of the features described above, or as an alternative to any of the foregoing embodiments, the pockets are located on the concave side of the airfoil.

In addition to one or more of the features described above, or as an alternative to any of the foregoing embodiments, the pockets are located on the convex and concave sides of the airfoil.

In addition to one or more of the features described above, or as an alternative to any of the foregoing embodiments, the pockets are configured with a negative taper.

In addition to one or more of the features described above, or as an alternative to any of the foregoing embodiments, the pockets are bordered by ribs having a height sufficient to form part of a final surface.

In one embodiment, a method of making a fan blade comprises: forging a fan blade; heat treating the fan blade; machining the fan blade to form pockets and ribs; shot peening the pockets and ribs; preparing surfaces of the pockets and ribs for bonding; applying a primer to the prepared surfaces; filling the pockets with an elastomeric composite.

In addition to one or more of the features described above, or as an alternative to any of the foregoing embodiments, preparing surfaces comprises etching, grit blasting, or laser cleaning.

In addition to one or more of the features described above, or as an alternative to any of the foregoing embodiments, the primer comprises a silicon rubber and the elastomeric composite comprises a silicon rubber.

In addition to one or more of the features described above, or as an alternative to any of the foregoing embodiments, the elastomeric composite comprises an elastomer and glass microspheres.

In addition to one or more of the features described above, or as an alternative to any of the foregoing embodiments, the elastomer is a thermoset and the method further comprises curing the thermoset.

In addition to one or more of the features described above, or as an alternative to any of the foregoing embodiments, the method further comprises applying an erosion coating to the elastomeric composite.

In addition to one or more of the features described above, or as an alternative to any of the foregoing embodiments, the method further comprises sanding the elastomeric composite.

In one embodiment, a gas turbine engine, comprises: a fan, comprising; a plurality of fan blades secured to a rotor, each of the plurality of fan blades having an airfoil secured to the rotor at one end wherein the airfoil comprises pockets filled with an elastomeric composite; a compressor; a combustor; and a turbine.

In addition to one or more of the features described above, or as an alternative to any of the foregoing embodiments, the elastomeric composite comprises an elastomer and glass microspheres.

In addition to one or more of the features described above, or as an alternative to any of the foregoing embodiments, an erosion coating is disposed on the elastomeric composite.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
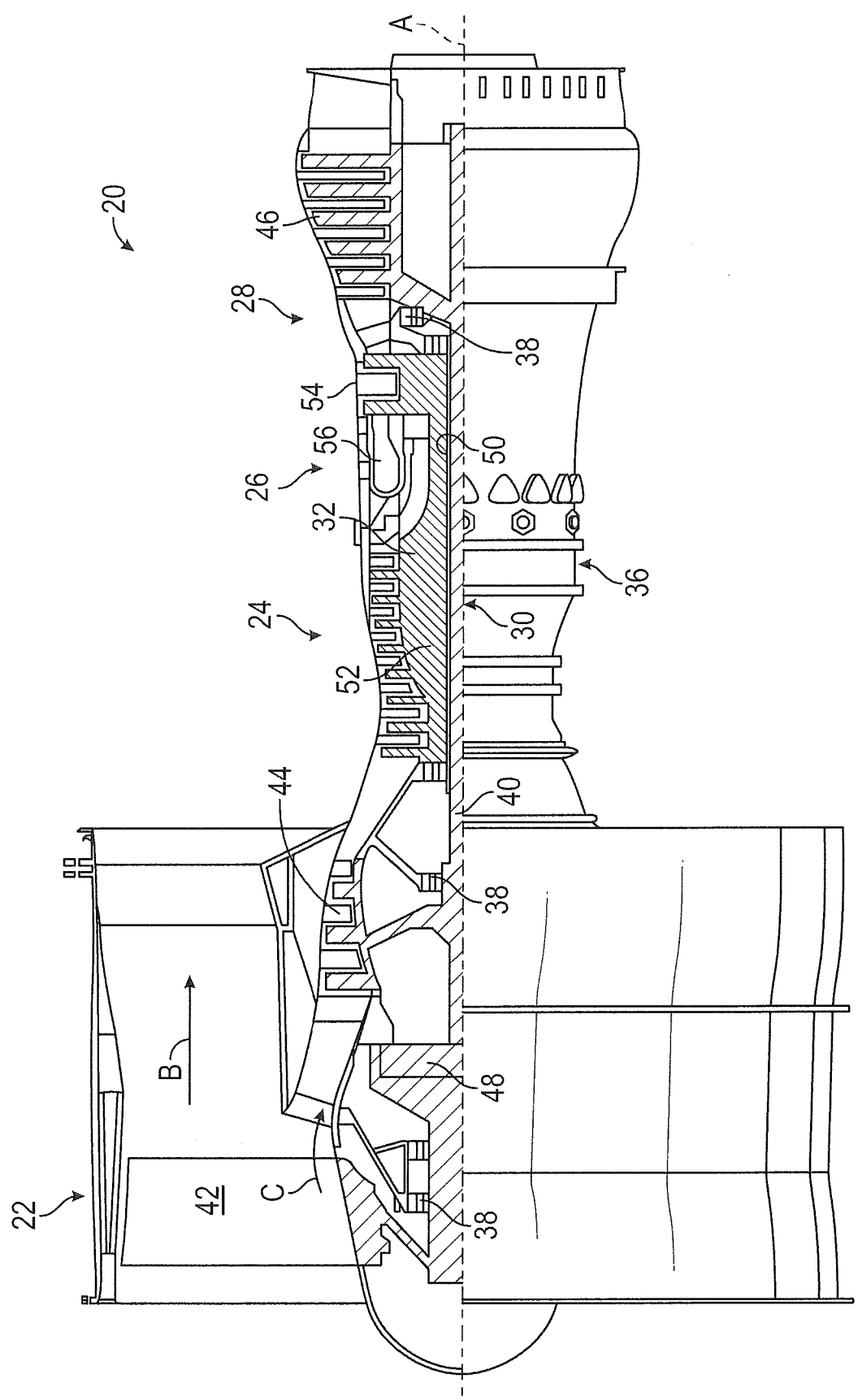
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
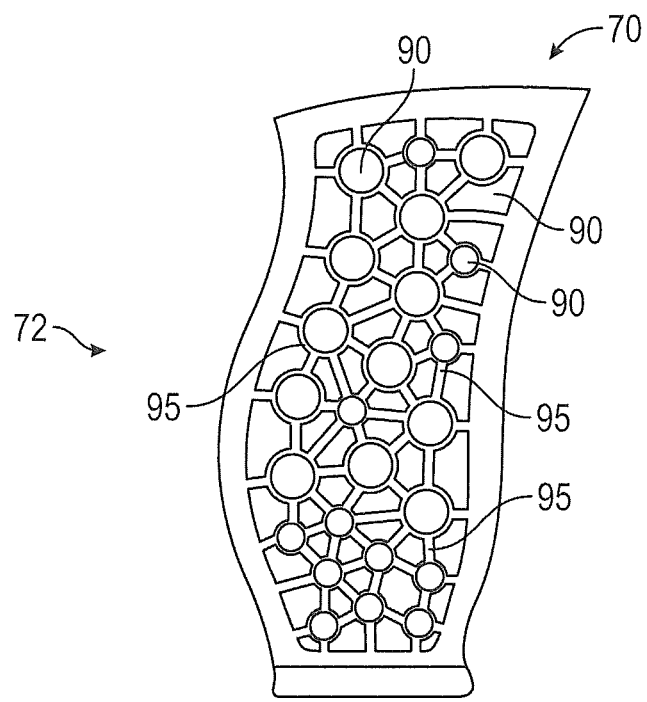
FIG. 2 is a depiction of a fan blade with pockets.

Referring now to FIG. 2, a fan blade 70 of the fan 42 of the engine 20 is illustrated. As is known in the related arts, the fan 42 comprises a plurality of fan blades 70. Each fan blade 70 includes an airfoil 72 and a root or root portion. The root or root portion is received within a slot or cavity of a rotor, rotor disk, fan hub or hub that rotates about axis A of the engine 20. Of course, other means of securement of the fan blades 70 to the hub are contemplated to be within the scope of various embodiments of the present disclosure.

Figure 3:
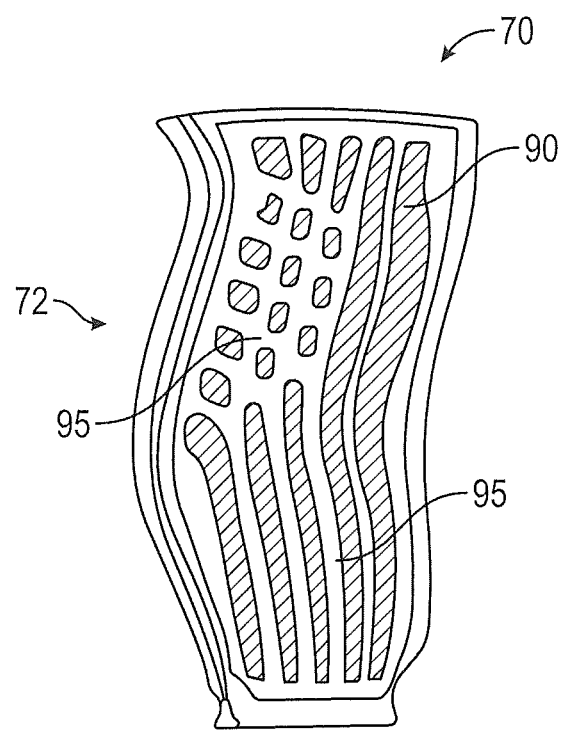
FIG. 3 is an alternate configuration of a fan blade with pockets.
Figure 4:
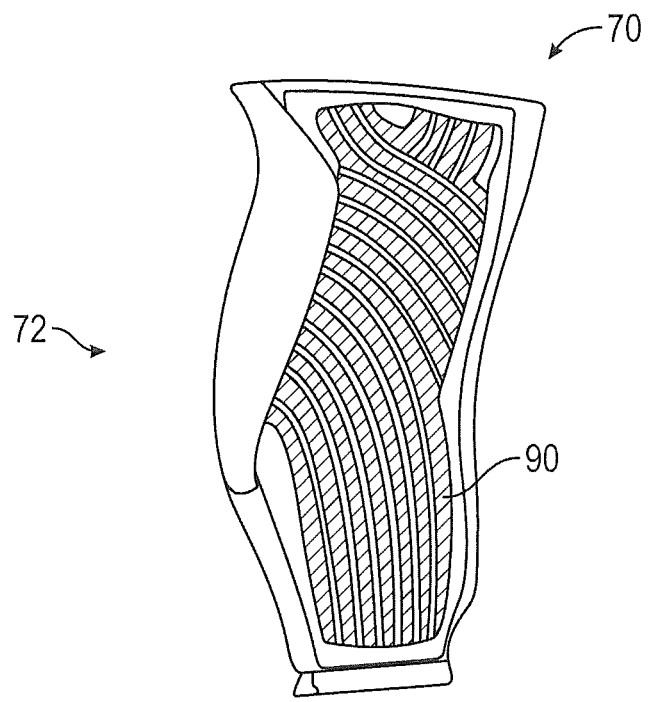
FIG. 4 is an alternate configuration of a fan blade with pockets.
Figure 5:
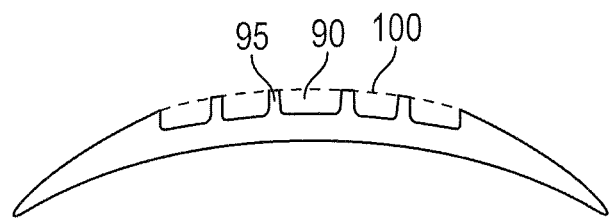
FIGS. 5-7 are cross sections of a fan blade having pockets.
Figure 6:
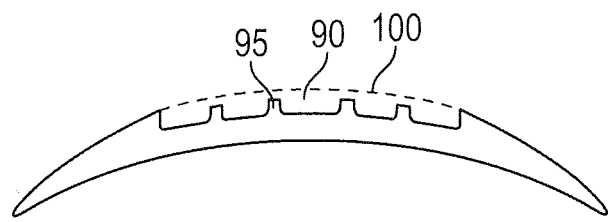
Figure 7:
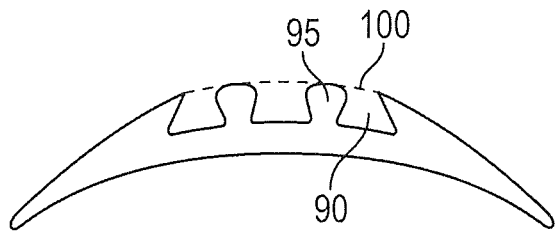

The airfoil 72 is forged from an aluminum alloy such as AA7255 or AA2060 or a titanium alloy such as Ti-6-4. In the example of a Ti-6-4 airfoil, the airfoil may be solution heat treated, then air cooled or liquid quenched, then aged to optimize tensile, yield, low cycle fatigue, and high cycle fatigue strengths. The fact that the airfoil's subsequent processing temperatures are less than 1000 F, enables maintaining the significantly improved mechanical properties (up to 20% increased tensile properties and up to 30% increased fatigue properties). The forged airfoil 72 has one or more pockets (recesses) 90 machined into the pressure side (the concave side), suction side (the convex side) or both. It is also contemplated that the pockets may be formed when forging the fan blade. The residual metal between the pockets is referred to herein as the ribs 95. The ribs may have any configuration that yields a fan blade which has sufficient strength under operating conditions. Other exemplary configurations are shown in FIGS. 3 and 4. The height of the ribs may be even with the final surface of the airfoil as shown in FIG. 5. FIG. 5 shows ribs 95 with a height sufficient to form part of the final surface 100 (in the absence of an erosion coating as described below). The height of the ribs may be less than the final surface of the airfoil as shown in FIG. 6 with the remaining height provided by the elastomeric composite. FIG. 6 shows ribs 95 having a height insufficient to form part of the final surface 100. In this embodiment, the elastomeric composite, the erosion coating, or a combination thereof may supply the additional height and form part of the final surface 100. The shape of the pockets may be configured with a negative taper to provide mechanical retention of the elastomeric composite as shown in FIG. 7. More specifically, the ribs may be tapered to form a pocket which is larger in width at the bottom of the pocket and smaller in width near the airfoil surface.

The pockets may also be shot peened in accordance with AMS 2430 or equivalent, to an intensity up to 9N or equivalent, using steel shot or ceramic beads with a size ranging up to and inclusive of SAE 110, but are not limited thereto. Shot peening can provide additional resistance to metal fatigue during engine operation, but such benefit cannot be captured with current hollow titanium fan blade processing due to such benefit being negated with subsequent required high temperature (above 1000 degrees F.) processing.

The surfaces of the pockets are prepared for filling. Preparing the pocket surfaces for filling may include cleaning, etching, grit blasting, laser cleaning, priming or a combination thereof. In some embodiments the pocket surfaces are coated with a primer. Typically the primer is chosen in combination with the elastomeric composite in order to enhance adhesion. For example, if the elastomer employed in the elastomeric composite is a silicone rubber then the primer is typically a silicone rubber as well. After the surface treatment, the pockets are filled with an elastomeric composite. When the elastomeric composite comprises a thermosetting material the elastomeric composite is cured. The airfoil having filled pockets may then be sanded, coated with an erosion coating or both, as needed.

The elastomeric composite comprises an elastomer and glass microspheres, polymer microspheres or a combination thereof. The elastomer can be a thermoplastic or a thermoset. It is desirable for the elastomer to have a compressive modulus sufficient to prevent deformation during a range of loading representative of the part's engine operation. When the elastomer is a thermoset the thermoset is cured, typically by heat, UV radiation, or both. Some thermosets require a catalyst, an initiator, or both for curing. Exemplary elastomeric materials include silicone rubbers such as Bluesil V-622 available from Bluestar Silicones of York, S.C. and Thermosil T7000 available from FMI Chemical of Bloomfield, Conn.

The glass or polymer microspheres may be solid, hollow, or a combination thereof. Typical microsphere sizes may be −325/+120 in mesh size, but are not limited thereto. In some embodiments the microspheres are hollow. It is preferable for the microspheres to have a density which is less than the density of the elastomer. The elastomeric composite may comprise the microspheres in an amount of 10% to 30% by weight, based on the total weight of the elastomeric composite. In addition, weight reducing fillers besides microspheres may also be used, such as gas cavities from the addition of foaming agents to the base polymer.

Exemplary erosion coatings include silicones, which can be applied as a b-staged or adhesively bonded film, or can be spray applied in solution form. The erosion coating may be applied by any useful method. For example, the erosion coating may be applied by spray coating or a film may be applied to the filled pockets and then heated to facilitate bonding to the filled elastomer. It is also contemplated that the erosion coating may be cured separately from, or together with, the elastomeric composite in the pockets.

Figure 8:
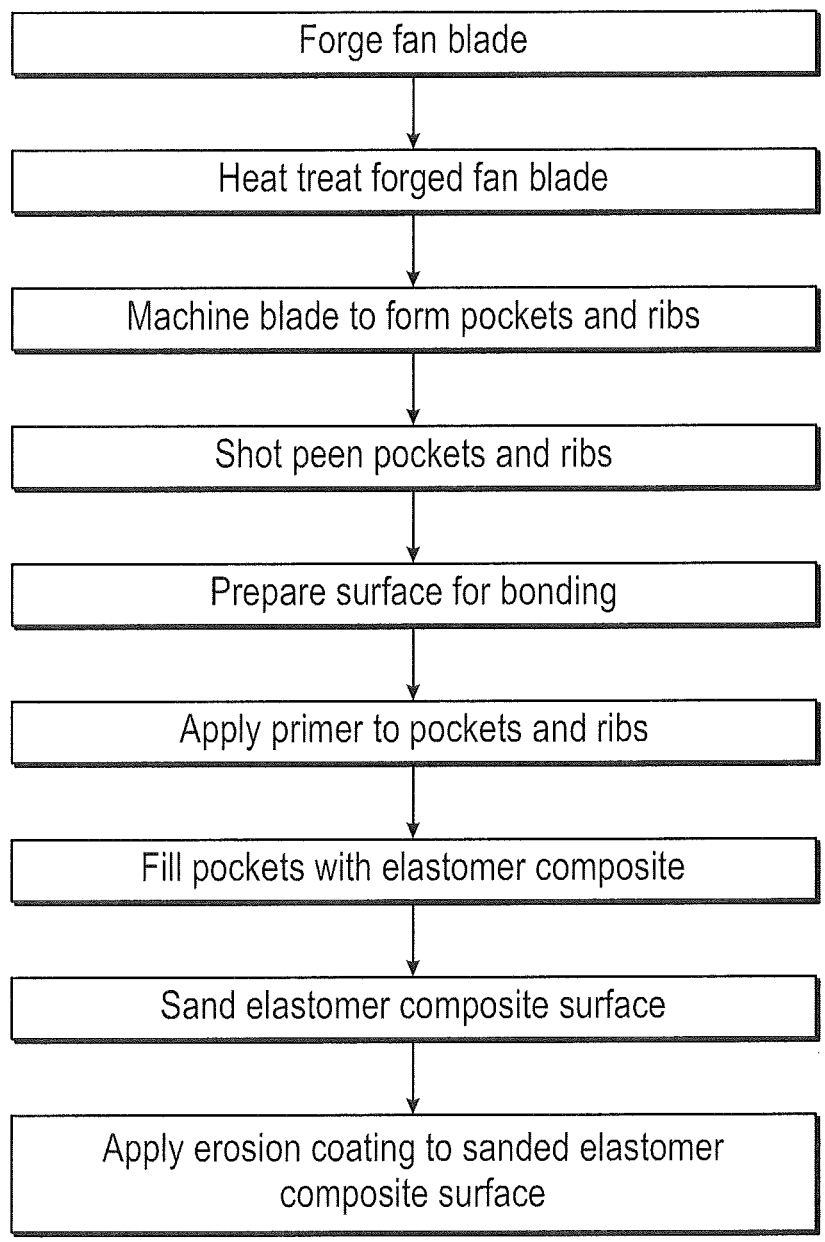
FIG. 8 is a flow chart of a method of making a fan blade with pockets.

A method of making the fan blade is shown in FIG. 8. The steps include forging the fan blade and then heat treating the forged blade. The blade is then machined to form the pockets and ribs. The pockets and ribs are then shot peened. The surfaces of the pockets and ribs are prepared for bonding, typically by etching or grit blasting. The primer is applied to the prepared surfaces and then the primed area is filled with the elastomeric composite. The elastomeric composite is cured if needed. The elastomeric composite may then be sanded if necessary and coated with an erosion coating.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan of a gas turbine engine, comprising: a plurality of fan blades secured to a rotor, each of the plurality of fan blades having an airfoil secured to the rotor at one end, wherein the airfoil comprises pockets filled with an elastomeric composite and an erosion coating disposed on the elastomeric composite; and
    wherein each of the pockets have a width at the bottom of the pocket that is larger than the width of the pocket near an airfoil surface.

2. The fan as in claim 1, wherein the elastomeric composite comprises a silicone rubber.

3. The fan as in claim 1, wherein the elastomeric composite comprises an elastomer and glass microspheres.

4. The fan as in claim 3, wherein the microspheres are present in an amount of 10 to 30% by weight, based on the total weight of the elastomeric composite.

5. The fan as in claim 1, wherein the pockets are located on the convex side of the airfoil.

6. The fan as in claim 1, wherein the pockets are located on the concave side of the airfoil.

7. The fan as in claim 1, wherein the pockets are located on the convex and concave sides of the airfoil.

8. The fan as in claim 1, wherein the pockets are bordered by ribs having a height sufficient to form part of a final surface.

9. A method of making a fan blade having filled pockets comprising:
    forging a fan blade;
    heat treating the fan blade;
    machining the fan blade to form pockets and ribs;
    shot peening the pockets and ribs;
    preparing surfaces of the pockets and ribs for bonding;
    applying a primer to the prepared surfaces;
    filling the pockets with an elastomeric composite.

10. The method of claim 9, wherein preparing surfaces comprises etching, grit blasting, or laser cleaning.

11. The method of claim 9, wherein the primer comprises a silicon rubber and the elastomeric composite comprises a silicon rubber.

12. The method of claim 9, wherein the elastomeric composite comprises an elastomer and glass microspheres.

13. The method of claim 12, wherein the elastomer is a thermoset and the method further comprises curing the thermoset.

14. The method of claim 9, further comprising applying an erosion coating to the elastomeric composite.

15. The method of claim 9, further comprising sanding the elastomeric composite.

16. A gas turbine engine, comprising: a fan, comprising; a plurality of fan blades secured to a rotor, each of the plurality of fan blades having an airfoil secured to the rotor at one end wherein the airfoil comprises pockets filled with an elastomeric composite, wherein each of the pockets have a width at the bottom of the pocket that is larger than the width of the pocket near an airfoil surface; a compressor; a combustor; and a turbine, wherein an erosion coating is disposed on the elastomeric composite.

17. The gas turbine engine as in claim 16, wherein the elastomeric composite comprises an elastomer and glass microspheres.

18. The fan as in claim 16, wherein the pockets are bordered by ribs having a height sufficient to form part of a final surface.

* * * * *